US008655965B2

(12) United States Patent
McWithey et al.

(10) Patent No.: US 8,655,965 B2
(45) Date of Patent: Feb. 18, 2014

(54) AUTOMATED MESSAGING RESPONSE IN WIRELESS COMMUNICATION SYSTEMS

(75) Inventors: Preston W. McWithey, Austin, TX (US); Chirag D. Shah, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 127 days.

(21) Appl. No.: 12/718,951

(22) Filed: Mar. 5, 2010

(65) Prior Publication Data

US 2011/0219080 A1 Sep. 8, 2011

(51) Int. Cl.
*G06F 15/16* (2006.01)

(52) U.S. Cl.
USPC ........................................ 709/206

(58) Field of Classification Search
USPC ........................................ 709/206
See application file for complete search history.

(56) References Cited

U.S. PATENT DOCUMENTS

| | | | | |
|---|---|---|---|---|
| 6,600,975 | B2* | 7/2003 | Moriguchi et al. | 701/1 |
| 8,315,597 | B2* | 11/2012 | Olincy et al. | 455/410 |
| 8,352,303 | B2* | 1/2013 | Lehmann et al. | 705/7.19 |
| 2004/0058647 | A1* | 3/2004 | Zhang et al. | 455/41.2 |
| 2004/0254715 | A1 | 12/2004 | Yamada | |
| 2006/0103513 | A1* | 5/2006 | Ihara et al. | 340/435 |
| 2007/0072553 | A1 | 3/2007 | Barbera | |
| 2008/0299959 | A1* | 12/2008 | Geyer et al. | 455/418 |
| 2009/0149168 | A1 | 6/2009 | McLean | |
| 2009/0221279 | A1* | 9/2009 | Rutledge | 455/418 |
| 2009/0224931 | A1 | 9/2009 | Dietz et al. | |
| 2010/0009626 | A1 | 1/2010 | Farley | |
| 2011/0151842 | A1* | 6/2011 | Olincy et al. | 455/414.1 |
| 2011/0151852 | A1* | 6/2011 | Olincy et al. | 455/418 |

FOREIGN PATENT DOCUMENTS

| | | |
|---|---|---|
| CN | 101527878 A | 9/2009 |
| JP | 2001313698 A | 11/2001 |
| JP | 2003174674 A | 6/2003 |
| JP | 2003258945 A | 9/2003 |
| JP | 2004015728 A | 1/2004 |
| JP | 2005236969 A | 9/2005 |
| JP | 2005303384 A | 10/2005 |
| JP | 2005354312 A | 12/2005 |
| JP | 2006246305 A | 9/2006 |

OTHER PUBLICATIONS

"Cellcontrol: Reducing Distractions While Drying, No Self Control, Get cellcontrol." Grobart, Sam, ObdEdge, LLC, 2009. Web, Dec. 11, 2009 <http://www.obdedge.com/consumer.html>.

(Continued)

*Primary Examiner* — Brian P Whipple
(74) *Attorney, Agent, or Firm* — Thien T. Nguyen

(57) ABSTRACT

Options for safely handling incoming data messages in a moving mobile device are provided within the mobile device. When an incoming data message is detected, the device determines its velocity. If the velocity exceeds a certain value, external data, such as visual or biometric data, measured by a device component is analyzed to determine whether the mobile device is in a driver position of a moving vehicle. If so, an announcement of the incoming call is prevented and a predetermined message is autonomously transmitted to the sender. If analysis of the external data is inconclusive, a prompt is presented to a recipient with selectable options of how to handle the incoming message. In response to the various inputs received from the recipient, the mobile device may either autonomously send a response message to the sender or may directly establish a voice call between the recipient and the sender.

33 Claims, 10 Drawing Sheets

(56) References Cited

OTHER PUBLICATIONS

"Driven to Distraction—A High-Tech Nanny to Cut Off Cellphones—Series," Grobart, Sam. The New York Times, Web. Nov. 22, 2009, <http://www.nytimes.com/2009/11/22/technology/22distracted.html?_r=2&hp=&pagewant>.

"DriveAssist Overview", Aegis Mobility, Web, Dec. 11, 2009, <http://www.aegismobility.com/home/driveassist/overview>.

"Your Personal Safe Driving Assistant—ZoomSafer, Distracted Driving Is A Leading Cause Of Accidents. Protect Your Family on the Road", ZoomSafer, Web. Dec. 11, 2009, <http://zoomsafer.com/personal.aspx>.

"Cellcontrol: Reducing Distractions While Driving, Stop Texting While Driving" ObdEdge, LLC, 2009, Web Dec. 11, 2009, <http://www.obdedge.com/>.

"Stop Texting and Talking Whiie Driving With DriveAssit", Aegis Mobility, Web. Dec. 11, 2009, <http://www.aegismobility.com/home/index.php>.

"Prevent Distracted Driving/ZoomSafer, Focused Drivers Are Safe Drivers, Stay Focused With ZoomSafer", ZoomSafer, Web. Dec. 11, 2009, <http.//zoomsafer.com/>.

"Cellcontrol: How It Works!, CellControl, No Self-Control? Get Cellcontrol", Overview, ObdEdge, LLC, 2009. Web. Dec. 11, 2009 <http://www.obdedge.com/how.html>.

International Search Report and Written Opinion—PCT/US2010/026551, ISA/EPO—May 19, 2011.

Taiwan Search Report—TW099107654—TIPO—Feb. 20, 2013.

\* cited by examiner

AUTOMATED MESSAGING RESPONSE IN WIRELESS COMMUNICATION SYSTEMS

BACKGROUND FIELD

The present disclosure relates, in general, to wireless communication systems and, more particularly, to automated messaging response in wireless communication systems.

RELEVANT BACKGROUND

Wireless communications systems make up a large and increasing percentage of all global communications. Such systems are implemented with various wireless communication networks, such as a wireless wide area network (WWAN), a wireless local area network (WLAN), a wireless personal area network (WPAN), and the like. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and the like. A CDMA network may implement one or more radio access technologies (RATs) such as cdma2000, Wideband-CDMA (W-CDMA), and so on. Cdma2000 includes the Telecommunications Industry Association's Interim Standards (IS) IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a BLUETOOTH™ network, an IEEE 802.15x, or some other type of network. BLUETOOTH™ is a trademark of the Bluetooth Special Interest Group (SIG). The techniques may also be implemented in conjunction with any combination of WWAN, WLAN and/or WPAN.

Participants in the wireless communication networks often access the system using various mobile devices or mobile stations. As used herein, a mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, the Wi-Fi Alliance's WI-FI™ systems, or other networks, and, regardless of whether satellite signal reception, assistance data reception, and/or position-related processing occurs at the device, at a server, or at another device associated with the network. Any operable combination of the above are also considered a "mobile station."

Much of the communication taking place in the early commercial wireless communication systems was voice communication. However, over the last decade, text messaging, which refers to the exchange of brief written messages between mobile phones over wireless networks has increased substantially. Early text messaging was implemented using short messaging service (SMS), a text messaging protocol for the GSM system. SMS was developed to use the telephony-optimized GSM system to transport messages on the signaling paths, used to control the telephony traffic during time periods, when no signaling traffic was present. In this way, unused resources in the system could be used to transport the messages without additional cost. However, the length of the messages was limited to 128 bytes (later improved to 140 bytes, or 160 7-bit characters), so that the messages would fit into the existing signaling formats.

While the early text messaging systems were implemented using SMS, modern text messaging systems have been extended to include messages containing image, video, and sound data, such as multimedia messaging service (MMS) messages, and e-mail messages using standard mail protocols, such as simple mail transfer protocol (SMTP) over transfer control protocol (TCP)/Internet Protocol (IP), and the like. E-mail messaging from wireless devices, as popularized by NTT DoCoMo's i-mode and the Research In Motion (RIM) BLACKBERRY®, have also assisted in increasing the volume of data messages that are exchanged over portable handheld devices.

The proliferation of text and email messaging (i.e., data messaging), while increasing the ability to communicate, has also brought an increase in automobile accidents in which drivers become distracted and preoccupied with sending or responding to data messages while driving. Similar results were have been experienced with the increased growth of mobile phones. As more people obtained access to mobile phones, there were increased numbers of accidents directly related to drivers being distracted either by talking on or operating the mobile phone. However, because the process for typing a response to a data message generally entails manually depressing some sort of keypad on the mobile device, drivers may become even more distracted for greater lengths of time simply because the mechanics of responding to a data message are much more involved. Studies have been undertaken which suggest that reaction times for individuals who are texting while driving are diminished at a rate much higher than that even of individuals who are driving while under the influence of alcohol. Such findings present a significant challenge to governmental authorities to protect the health and safety of its citizens, while also being sensitive to personal rights. There are already governmental jurisdictions that have banned text messaging while driving. Some bans have been complete bans, while others have been restricted to designated areas, such as school zones or high pedestrian traffic zones.

In the example of mobile phone use, safety systems have been conceived of for diminishing the danger or temptation to use a mobile phone when driving conditions are dangerous. One such system provides an in-vehicle communication system that includes various sensors (e.g., speed sensor, accelerometer, global positioning satellite (GPS) receiver, and the like) that are capable of detecting the speed and location of the vehicle. The in-vehicle communication system establishes communication with a driver's mobile phone and, when incoming calls are detected, the in-vehicle system uses the sensors to determine a speed and location of the vehicle. If the vehicle is in motion and the safety application determines that it would be dangerous for the driver to answer the call, the in-vehicle system autonomously answers the call, plays a pre-determined message to the caller that the driver cannot answer the call, and then actively records a message from the caller and stores it to a memory of the in-vehicle system. When the dangerous condition has ended, such as when the driver stops the car, the in-vehicle system provides the driver with the number of calls, if any, that were received while driving and plays any messages to the driver. Instead of playing the pre-determined message to the caller, the system could also reject the call completely, but send an email to the caller containing similar information. However, such a systems are directed only to voice communications and do not address the specific issues that arise in data messaging.

SUMMARY

The various aspects of the present teachings are directed to providing options for safely handling incoming data messages in a moving mobile device. When an incoming data message is detected, the mobile device determines its velocity. If the velocity exceeds a certain value, a prompt is displayed or presented audibly to a recipient with selectable options of how to handle the incoming message. In response to the various inputs received from the recipient, the mobile device may either autonomously send a response message to the sender or may directly establish a voice call between the recipient and the sender.

Further representative aspects of the present teachings are directed to methods for managing incoming data messages at a mobile device. These methods include receiving a data message from a sender, determining a velocity of the mobile device in response to receiving the message, and analyzing external data measured by at least one component of the mobile device in response to the velocity being greater than a predefined value. Furthermore, in response to the external data indicating that the mobile device is in a driving position of a moving vehicle, announcement of the incoming data message is prevented, and a predetermined response message is autonomously transmitting to the sender.

Additional representative aspects of the present teachings are directed to mobile devices that include a processor, a transceiver coupled to the processor and to an antenna array, a display device coupled to the processor, an inertial reference apparatus coupled to the processor, at least one external data capture device, a storage memory coupled to the processor, and an automated response module stored on the storage memory. When executed by the processor, the executing automated response module configures the mobile device to receive a data message from a sender, to determine, in response to receiving the message, a velocity of the mobile device using the inertial reference apparatus, and to analyze, in response to the velocity exceeding a predetermined value, the external data measured by the external data capture device. Furthermore, in response to the external data indicating that the mobile device is in a driving position of a moving vehicle, the mobile device is configured to prevent announcement of the incoming data message and to autonomously transmit a predetermined response message to the sender.

Still further representative aspects of the present teachings are directed to computer readable media including program code tangibly stored thereon. This program code includes code to receive a data message from a sender, code, executable in response to receiving the message, to determine a velocity of a mobile device, code, executable in response to the velocity being greater than a predefined value, to analyze external data measured by at least one of the components of the mobile device, code, executable in response to the external data indicating that the mobile device is in a driving position of a moving vehicle, to prevent announcement of the incoming data message and to autonomously transmit a predetermined response message to the sender.

Further representative aspects of the present teachings are directed to systems for managing incoming data messages at a mobile device. These systems include means for receiving a data message from a sender, means, executable in response to the receiving, for determining a velocity of the mobile device, means, executable in response to the velocity being greater than a predefined value, for analyzing external data measured by at least one component of the mobile device, means, executable in response to the external data indicating the mobile device is in a driving position of a moving vehicle, for preventing announcement of the incoming data message and for autonomously transmitting a predetermined response message to the sender.

The foregoing has outlined rather broadly the features and technical advantages of the present disclosure in order that the detailed description that follows may be better understood. Additional features and advantages can be described hereinafter, which form the subject of the claims of the disclosure. It should be appreciated by those skilled in the art that the conception and specific aspects disclosed may be readily utilized as a basis for modifying or designing other structures for carrying out the same purposes of the present disclosure. It should also he realized by those skilled in the art that such equivalent constructions do not depart from the technology of the disclosure as set forth in the appended claims. The novel features, which are believed to be characteristic of the disclosure, both as to its organization and method of operation, together with further objects and advantages, can be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWING

For a more complete understanding of the present disclosure, reference is now made to the following description taken in conjunction with the accompanying drawings.

DETAILED DESCRIPTION

Figure 1:
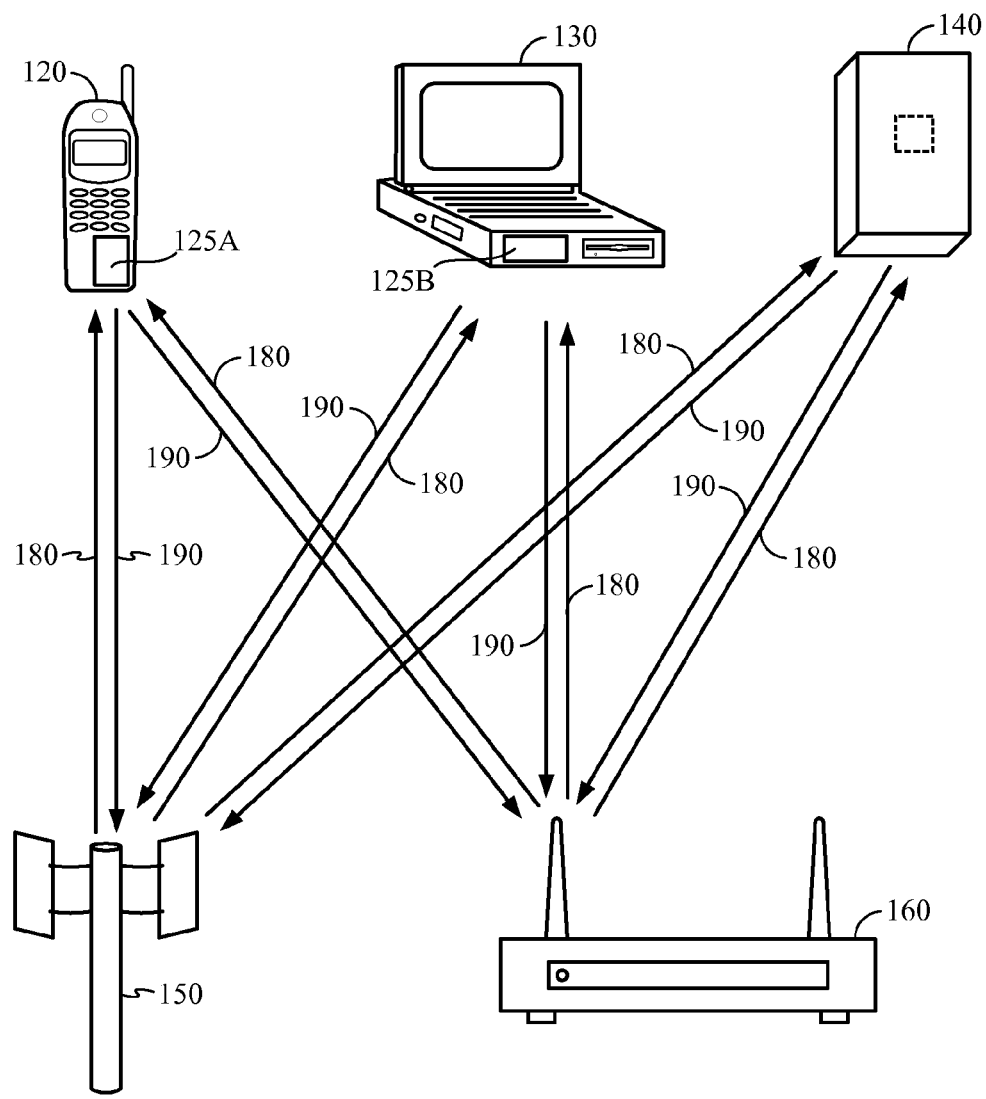
FIG. 1 is a block diagram illustrating an exemplary wireless communication system into which such memory may be advantageously employed.

FIG. 1 is a block diagram illustrating an exemplary wireless communication system 100 into which such memory may be advantageously employed. For purposes of illustration, FIG. 1 shows three remote units 120, 130, and 140 and two base stations 150 and 160. It will be recognized that wireless communication systems may have many more remote units and base stations. FIG. 1 shows forward link signals 180 from the base stations 150 and 160 and the remote units 120, 130, and 140 and reverse link signals 190 from the remote units 120, 130, and 140 to base stations 150 and 160.

In FIG. 1, remote unit 120 is shown as a mobile telephone, remote unit 130 is shown as a portable computer, and remote unit 140 is shown as a computer in a wireless local loop system. Although the example depicted in FIG. 1 illustrates remote units according to the teachings of the disclosure, the disclosure is not limited to these exemplary illustrated units. For example, the remote units may be cell phones, hand-held personal communication systems (PCS) units, portable data units such as personal data assistants, or fixed location data units such as meter reading equipment. The present disclosure may be suitably employed in any device which includes the improved resistive memory.

Many wireless devices now also include some sort of positioning system. With the increase in complexity of such devices, position information is often used in obtaining directions or for verifying a location of a user or for many other types of applications that operation on such wireless devices. Some such positioning systems rely on the terrestrial communication network by obtaining location information for one or more network base stations that the device is connected to. Other positioning systems leverage existing satellite networks used to implement a general positioning system.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc. and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS. Wireless devices which leverage an SPS will include a satellite receiver that is capable of detecting the satellite positioning signals and using those signals to determine the device location, either through its own calculations or calculations made in conjunction with the wireless communication system to which it is connected.

Still other modem wireless devices include inertial reference systems. An inertial reference system allows for the determination of position, orientation, and velocity of an object without using an external reference point. Such systems include a processor, which may be a processor shared with another device, and one or more sensors for detecting the objects motion. The sensors may be implemented using acceleration sensors, such as accelerometers, rotational sensors, such as gyroscopes, or any number of other types of motion sensors or combinations of motions sensors. The various aspects of the teachings herein are not limited to any particular type of sensor. The inertial reference systems allow the wireless devices to detect their orientations for purposes of screen display orientation, as input to games or other applications running on the device, or the like.

Many wireless devices also include the capability to transmit data messages (e.g., text messages, multimedia messages, emails, and the like). The device user will manually enter the message using various keypad configurations and entry methods on the device, provide an address of the intended recipient or recipients, and transmit the data message over the available wireless communication network to the intended recipient or recipients. On the receiving side, the recipient's wireless device will indicate the arrival of the data message, provide an interface prompt to the recipient to view the data message, and then, when selected to view the data message, display the data to the recipient on the visual display of the recipient's device. Because of the immediacy of exchanging data messages, human nature often reflects a compulsivity to both view and respond to such data messages as soon as possible. In other words, when a recipient detects the message indicator of his or her wireless device, it is often difficult for the recipient to resist both immediately looking at the message and then immediately responding to the message. This "impulsive" process becomes dangerous, and sometimes illegal, when the recipient is driving or is within a restricted area and attempts to type out and send a response.

Figure 2:
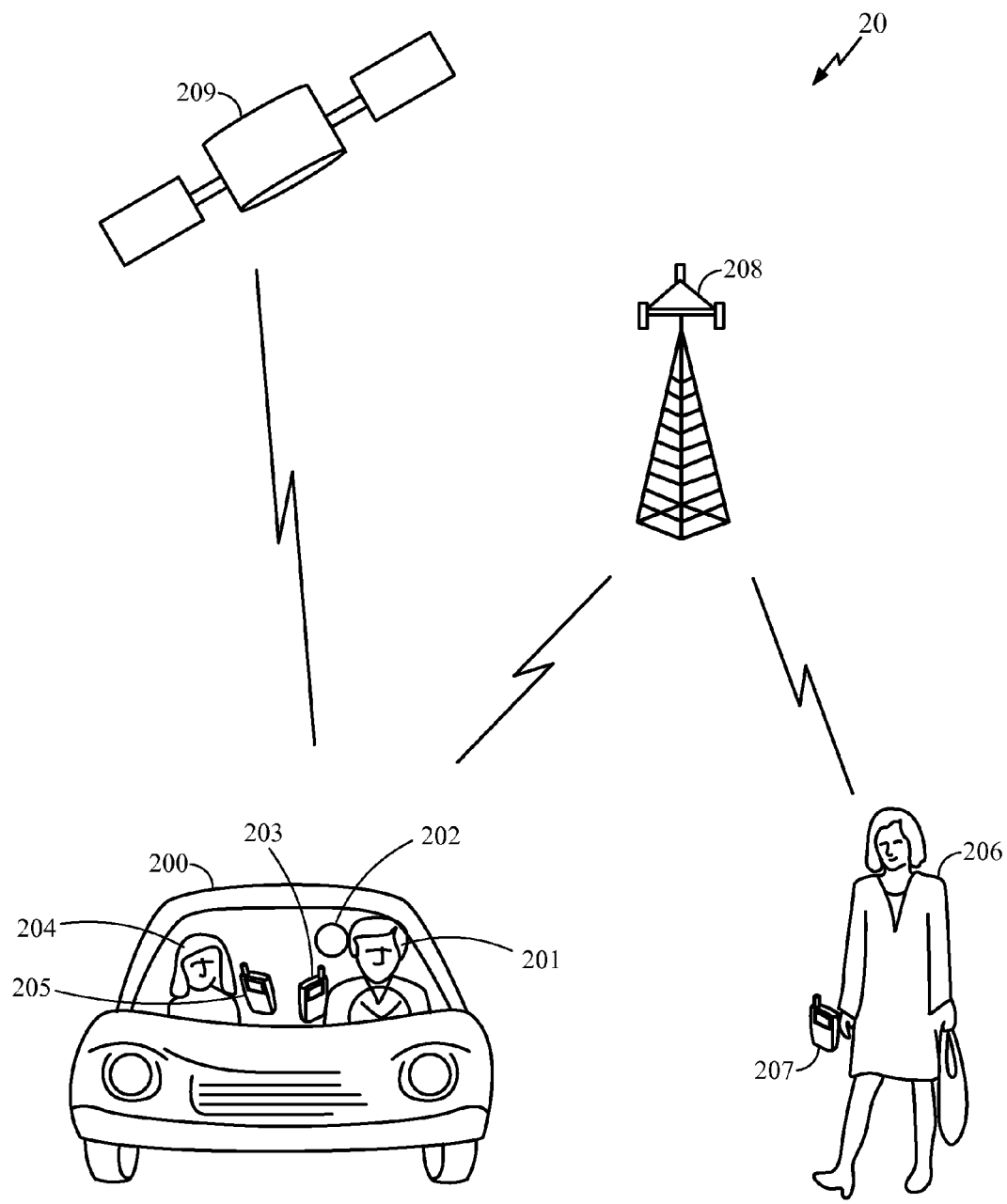
FIG. 2, a diagram is shown illustrating a wireless communication network configured according to one aspect of the present teachings.

Turning now to FIG. 2, a diagram is shown illustrating a wireless communication network 20 configured according to one aspect of the present teachings. Two occupants of an automobile 200, a driver 201 and a passenger 204, each have a mobile device, devices 203 and 205. Additionally, the driver 201 is wearing a headset 202 that enables hands-free communication through the device 203. As the driver 201 drives the automobile 200, a sender 206 sends a data message to the passenger 204 using the mobile device 207. The mobile device 207 transmits the message to a network base station 208, which relays the message to the mobile device 205. Upon receipt of the data message, the mobile device 205 first determines its state of motion. The mobile device 205 includes an accelerometer (not shown) that is capable of determining its velocity. The mobile device 205 determines that it is traveling at a velocity that is faster than a human could possibly run or walk. Based on this velocity determination, an automated response feature in the mobile device 205 presents a prompt on its display asking the passenger 204 whether he or she is able to safely handle the incoming data message. Because the passenger 204 is not driving the automobile 200, the passenger 204 responds to the prompt that he or she can safely handle the message. Based on this response, the automated response feature allows the message to be presented to the passenger 204 on the display of the mobile device 205. The passenger 204 would then be able to read and respond to the message as normal.

The sender 206 then decides to send a data message to the driver 201. The mobile device 207 transmits the message to the network base station 208, which relays the message to the mobile device 203. Upon receipt of the data message, the mobile device 203 first determines its state of motion. The mobile device 203 includes an accelerometer (not shown) and an SPS receiver (not shown). The SPS receiver receives positioning signals from an SPS that includes a satellite 209. In addition to these positioning signals, the accelerometer in the mobile device 203 determines its velocity. The mobile device 203 determines that it is traveling at a velocity that is faster than a human could possibly run or walk. Based on this velocity determination, an automated response feature in the mobile device 203 selects a prompt to present to the driver 201. However, prior to presenting the prompt on its display, the mobile device 203 detects that the driver 201 is currently using the headset 202. Instead of simply presenting the prompt on its display, the mobile device 203 plays an audio prompt to the driver 201 via the headset 202 in addition to presenting the prompt on the display. The prompt asks the driver 201 if he or she would like to hear the data message converted into audio by a text-to-speech function or enable the automated response. The prompt may also provide an option to the driver 201 to directly dial the sender 206 to have a hands-free conversation. As the driver 201 speaks the response to the prompt, speech recognition functionality extracts the response commands and triggers the associated function.

In the aspect depicted in FIG. 2, the driver 201 speaks the command to hear the data message read. Based on this command, the mobile device 203 converts the data message into an audio file using a text-to-speech function, and plays the audio to the driver 201. When the audio ends, the mobile device 203 plays an additional prompt to the driver 201 providing options to dial the sender 206 for a hands-free call, to enable the automated response, or to construct a response message verbally. The driver 201 answers with a command to record a response message verbally. The mobile device 203 then records a verbal message dictated by the driver 201. The mobile device 203 then presents an option to the driver 201 whether to send the verbal message as an audio file or whether to convert the driver's verbal message to a text message using speech-to-text functionality in the mobile device 203. When the driver 201 selects to send an audio file, the mobile device 203 packages the verbal message into a multimedia message file. The mobile device 203 then transmits the multimedia message file to the sender 206 using a compatible multimedia message protocol, such as MMS. If the driver 201, instead, selects to send a text message, the mobile device uses its speech-to-text functionality to convert the driver 201's verbal message into its text equivalent. The mobile device 203 may then package the converted text into a text message and transmit the text message back to sender 206.

It should be noted that in alternative aspects of the present teachings, instead of providing an option to the driver 201 to select whether to send a recorded verbal message as either a multimedia message file or a text message, the logic in the mobile device 203 may sense the length of the verbal message to be sent. If the message is shorter than a predetermined length, the mobile device 203 autonomously converts the verbal message to text using a built-in speech-to-text functionality. Otherwise, the mobile device 203 continues to package and send the verbal messages as an audio file using a multimedia message.

Figure 3:
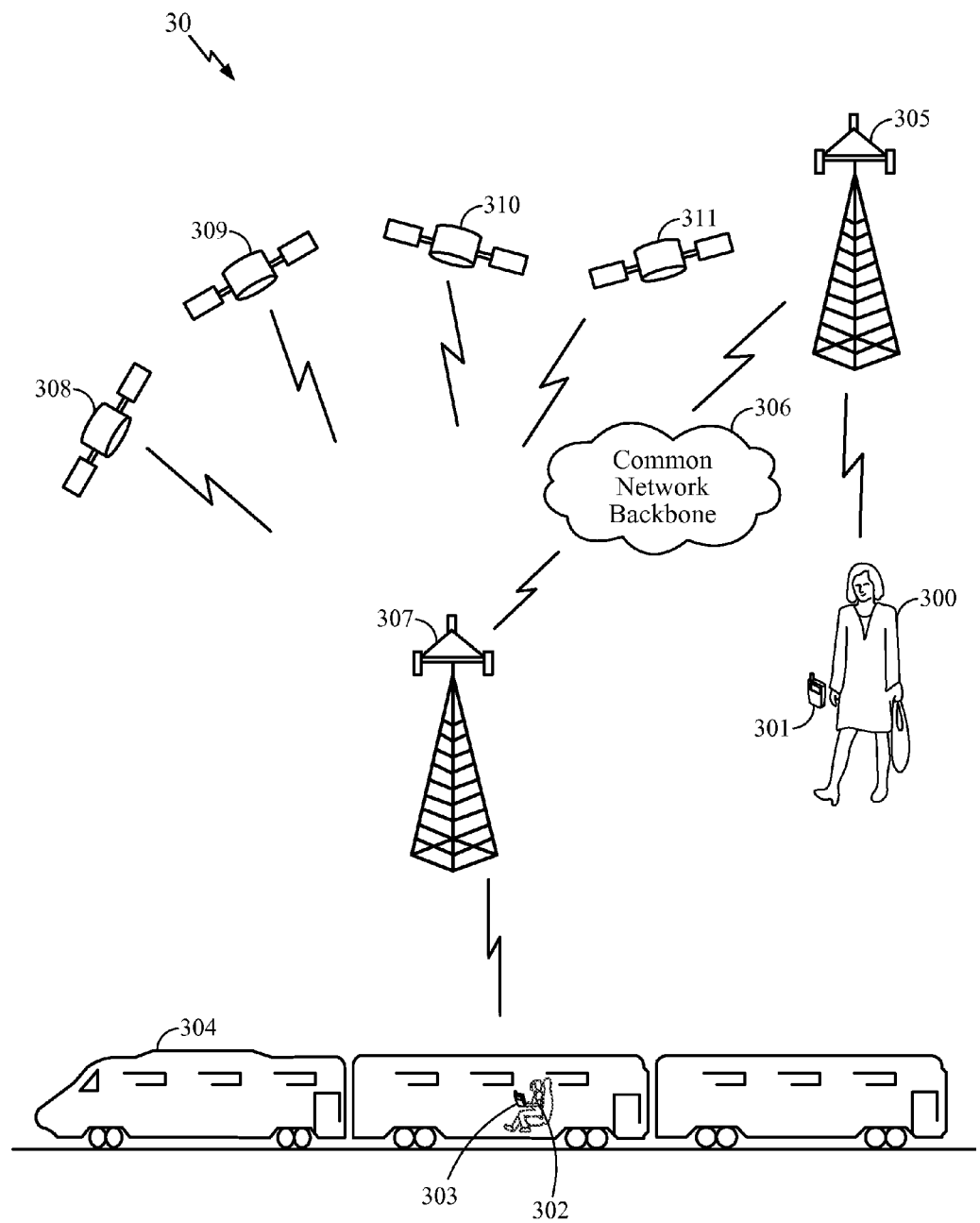
FIG. 3 is a diagram illustrating a wireless communication system configured according to one aspect of the present teachings.

FIG. 3 is a diagram illustrating wireless communication system 30 configured according to one aspect of the present teachings. A sender 300 with a mobile device 301 transmits a data message addressed to a recipient 302 traveling on a train 304. The data message is transmitted to a network base station 305 in communication with the mobile device 301. The network base station 305 transmits the message over the communication network backbone 306 to a network base station 307, which is in communication with the mobile device 303 of the recipient 302. The network base station 307 forwards the message to the mobile device 303. Upon receipt of the data message, an automated message function on the mobile device 303 determines its current velocity. The mobile device 303 uses positioning signals from an SPS which includes satellites 308-311. By calculating the timing between successive position locations, the automated message function determines the velocity of the mobile device 303. Because the velocity of the mobile device 303 is higher than the velocity that a person could walk or run, the mobile device 303 determines that the recipient 302 may be driving. In response, the mobile device 303 presents a prompt to the recipient 302 on its display asking whether the recipient 302 is able to safely handle the incoming message. Even though the recipient 302 is not driving, he or she does not believe that they want to handle the incoming message and, instead, selects the response to the prompt that enables the automated response. The mobile device 303 accesses a database of pre-determined responses and selects the response previously designated by the recipient. It then transmits the response message to the network base station 307, which transmits the response message to the network base station 305 over the communication network backbone 306. The network base station 305 forwards the automated response message to the mobile device 301 and presents it to the sender 300.

In the described aspect, the mobile device 301 also includes a safety log (not shown) which records all activities of analyzing the automated response functionality. Thus, when the mobile device makes a determination that it may be unsafe to respond, that action and time is noted in the safety log along with the manner in which the recipient 302 selects to respond to the prompt. An employer or even a law enforcement official may obtain the information or records maintained in the safety log by various means, including long- or short-ranged wireless protocols, or through direct connection with a physical connector. In additional aspects, a law enforcement official may use a secret, law enforcement code to access the mobile device 301 in order to obtain the information in the safety log. If enabled for wireless connectivity, a law enforcement official may even obtain this data by driving along side the vehicle in which the mobile device 301 is located. Therefore, evidence of a possible violation of any anti-mobile device laws could be obtained prior to the official stopping the vehicle.

It should be noted that selective aspects of the present teachings may be conducive to managing employer-supplied mobile devices. In this manner, the employer may either completely prevent the employee from responding to data messages while traveling above a certain velocity or may provide the employee with the ability to make their own decisions regarding how to safely respond. The safety log feature would also provide a benefit to employer-supplied mobile devices in order to maintain a record of how their employees are assessing safe or dangerous response situations.

In an alternative example aspect descriptive of the illustrations in FIG. 3, the automated message function of the mobile device 301 includes a simple binary functionality, such that if the velocity is determined to be higher than the velocity that a person could walk or run, a determination is autonomously made that it is unsafe for the recipient 302 to respond and an predetermined message is autonomously sent to the sender without first prompting the recipient 302. In such cases, either the recipient 302 will be able to respond to the sender 300 when the mobile device 301 is not moving faster than the velocity limit or if it is moving faster, the response functionality available to the recipient 302 will be deactivated.

In an additional aspect of the present teachings, instead of completely deactivating the response capability of the mobile device 301 while it is traveling faster than a certain velocity, the mobile device 301 will first search to detect whether the recipient 302 is using a hands-free communication device. If the mobile device 301 detects such a hands-free communication device, it will continue to allow the recipient 302 access to the range of response options discussed with regard to the first aspect described in FIG. 3. Otherwise, if no such hands-free device is detected, the mobile device 301 proceeds with deactivating the entire response capability.

Figure 4:
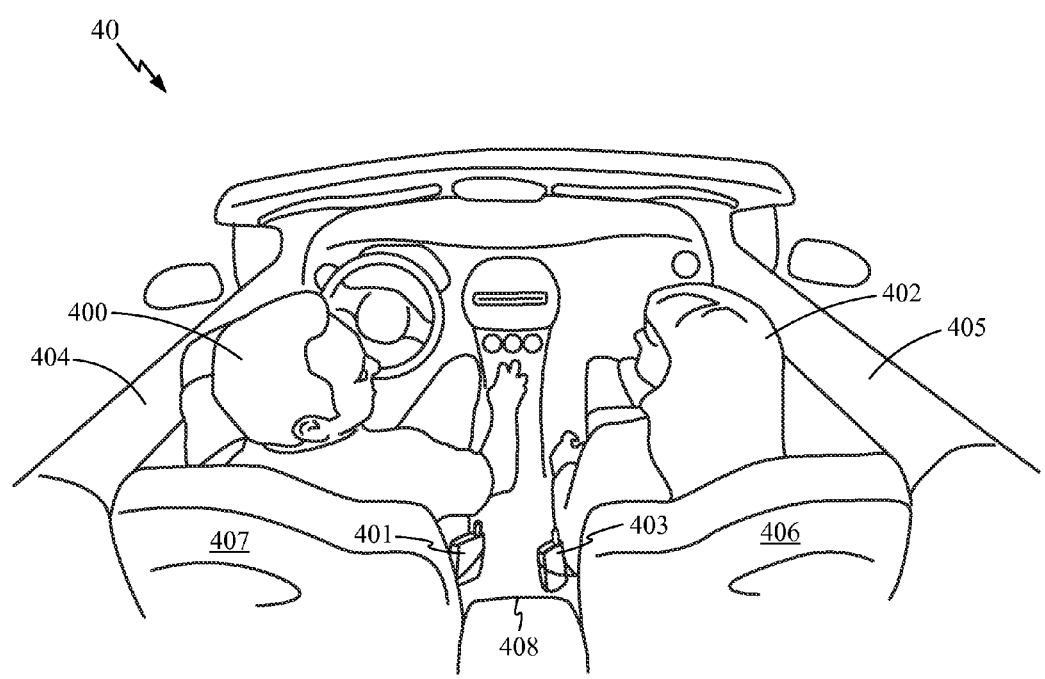
FIG. 4 is a diagram illustrating a wireless communication system configured according to one aspect of the present teachings.

FIG. 4 is a diagram illustrating wireless communication system 40 configured according to one aspect of the present teachings. Mobile devices, such as mobile devices 401 and 403 also include camera functionality. The users, a driver 400 and a passenger 402, would use such camera functionality to take photographs or videos. However, this camera functionality does not need to be reserved only for recreational application. Applications running on the mobile device may take control of the camera functionality to create visual images that the application may use to analyze the positioning of the mobile device. Similarly, an application may take control over the microphone to take audio samples of the surrounding area. These audio samples have even been used to detect the heart rate of the person near the microphone. Thus, applications designed to provide automated response functionality may leverage additional information from the camera functionality and/or microphone to aid in the analysis for determining whether the mobile device belongs to the driver 400.

In operation, a sender (not shown) initiates a call to the driver 400. As the mobile device 401 receives indication of an incoming call, it begins by analyzing a velocity of the mobile device 401. After determining that the mobile device 401 is traveling at a velocity exceeding a walking speed, an automatic response application takes control of the camera function of the mobile device 401. With the mobile device 401 in a belt holster of the driver 400, a small, clear view from the camera function is able to capture an image facing the passenger side 405 of the car. The response application analyzes the captured image and detects the passenger seat 406 being located on the left-side, i.e., the passenger side 405 of the car. It also detects the passenger 402 on the passenger side 405 of the car and a center console 408 located between the driver seat 407 and passenger seat 406. In analyzing these elements within the capture image, the application may determine that the mobile device 401 is located on the driver side 404 of the car.

Before making its final determination, however, the response application running on the mobile device 401 takes control of the microphone to take an audio sample of the surrounding location. The audio sample is used to listen for the closest heart beat. Using the heart beat, the application can determine the proximity of the mobile device 401 to the heart beat and may also determine the location from which the closest heart beat is being heard and the heart rate. The direction and proximity of the heart beat may be used to determine if the mobile device 401 is in the possession of the driver 400. The heart rate may also be used in a statistical analysis to determine whether the person in close proximity to the mobile device 401 is, perhaps, driving or not. Studies have indicated that people exhibit a slightly elevated heart rate when driving, as opposed to when these persons are not driving. The application running on the mobile device 401 may initialize itself by taking the resting heart rate of the driver 400, such that when comparing the measured heart rate during an automated response situation, it would have the resting heart rate to compare against the measured heart rate. The application running on the mobile phone 401, thus, determines that, based on the detected heart rates, the mobile phone 401 is in possession of the driver 400, and also that the detected heart rate is elevated from the normal resting heart rate of the driver 400. Using this information, the application on the mobile phone 401 determines that the driver 400 is driving and the mobile phone 401 is in possession of the driver 400. Based on this determination, the mobile phone 401 prevents the incoming call from ringing and, instead, sends an automated message to the sender indicating that the driver 400 is not in a position to safely answer the mobile device 401. The application allows the sender to leave a message that will be presented to the driver 400 when the driver may safely address the message.

The mobile device 403 also is configured with an automated response system. In operation, a sender places a call to the passenger 402. As the mobile device 403 detects the incoming call, it performs a velocity check to determine if the mobile device 403 is moving faster than a walking speed. If so, then the automated response system further analyzes the status of the mobile device 403 by assuming control of the camera component of the mobile device 403. The camera component captures image data that is analyzed by the automated response system. In this analysis, the automated response system determines that the mobile device 403 is located on the passenger side 405 by recognizing the position of the driver seat 407 and the center console 408. Because the determination is that the mobile device 403 is on the passenger side 405, the analysis stops and the incoming call is allowed to come through in a normal manner.

Figure 5:
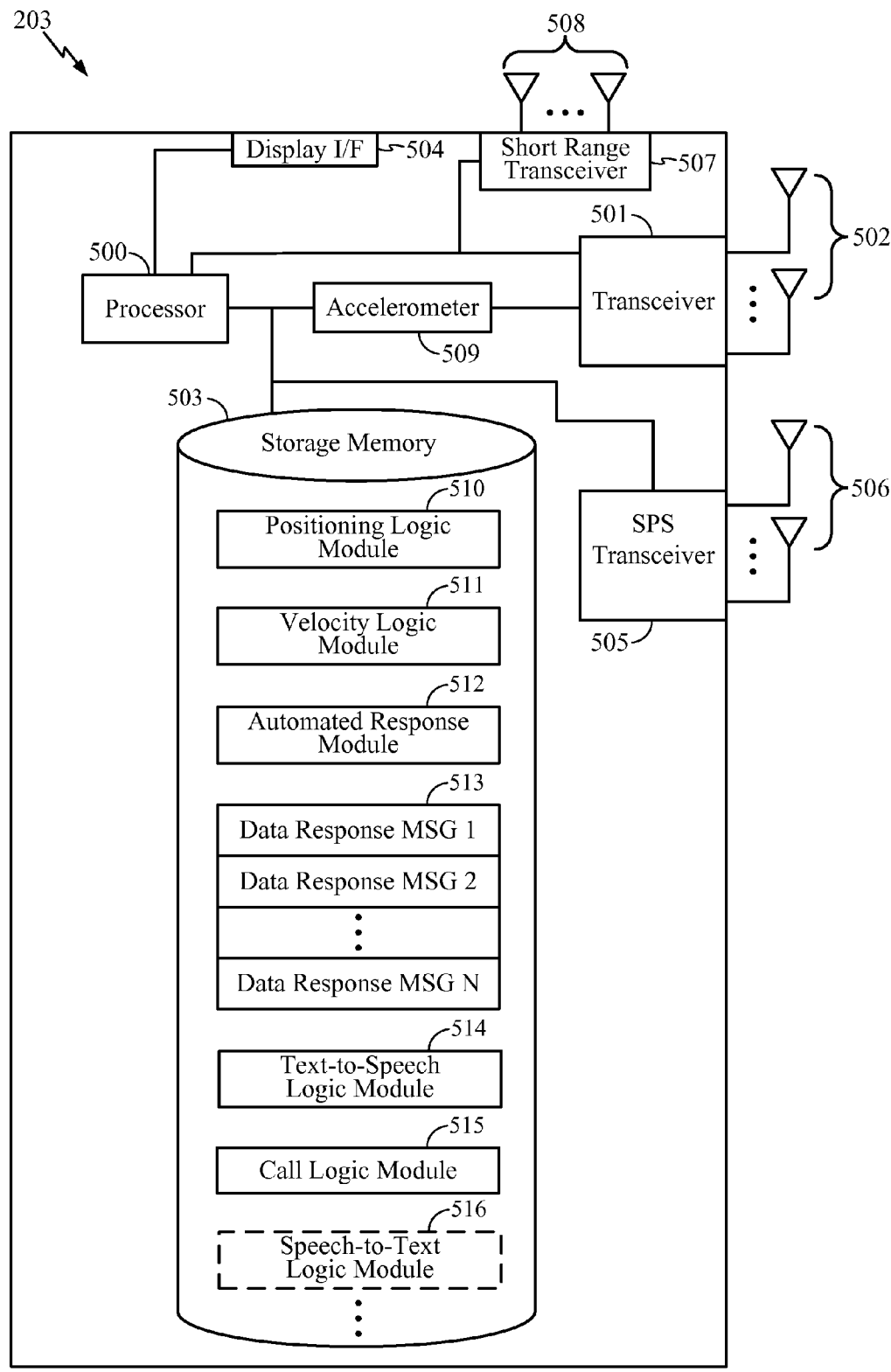
FIG. 5 is a block diagram illustrating detailed components of one of the mobile devices from FIG. 2.

FIG. 5 is a block diagram illustrating detailed components of the mobile device 203. The mobile device 203 includes a processor 500 and a transceiver 501 coupled to an antenna array 502, which enables mobile communication for the mobile device 203. The mobile device 203 further includes a storage memory 503, a display interface 504, that controls presentation of data on the device display (not shown), as well as an SPS transceiver 505 coupled to an antenna array 506 for detecting positioning signals from an SPS, and a short range transceiver 507 coupled to an antennal array 508 for communicating using a short range communication protocol, such as for communicating with a headset, speakers, and the like. The storage memory 503 stores an automated response module 512, which, when executed by the processor 500, configures the mobile device 203 to execute a velocity logic module 511 to determine its velocity when a data message is received at the mobile device 203. The processor 500 executes the velocity logic module 511, which calculates the velocity of the mobile device 203 using position location data provided by a positioning logic module 510, also executed by the processor 500, and orientation data provided by an accelerometer 509. The executing positioning logic module 510 uses the SPS transceiver 505 and the antenna array 506 to receive the positioning signals for determining the position location data.

The executing automated response module 512 determines, based on the calculated velocity, whether the mobile device 203 is moving at a velocity that exceeds a velocity that a person can walk or run. If so, the executing automated response module 512 presents a prompt to a user through the display interface 504. The prompt provides command options for the user: (1) to select to autonomously transmit one of the data response messages in a data store 513 to the data message sender; or (2) to execute a call logic module 515 to place a voice call to the sender. The mobile device 203 also includes an optional speech-to-text logic module 516, which, when executed by the processor 500, allows the user to dictate a message that is converted from speech into a text-based data message. The executing automated response module 512 also accesses the short range transceiver 507 and antenna array 508 to detect if the user is using a hands-free headset. If such a headset is detected, the executing automated response module 512 presents the prompts audibly to the user through the headset. In addition, a third option is presented to the user to have the data message converted into an audio using a text-to-speech logic module 514 executed by the processor 500 and played to the user.

Figure 6:
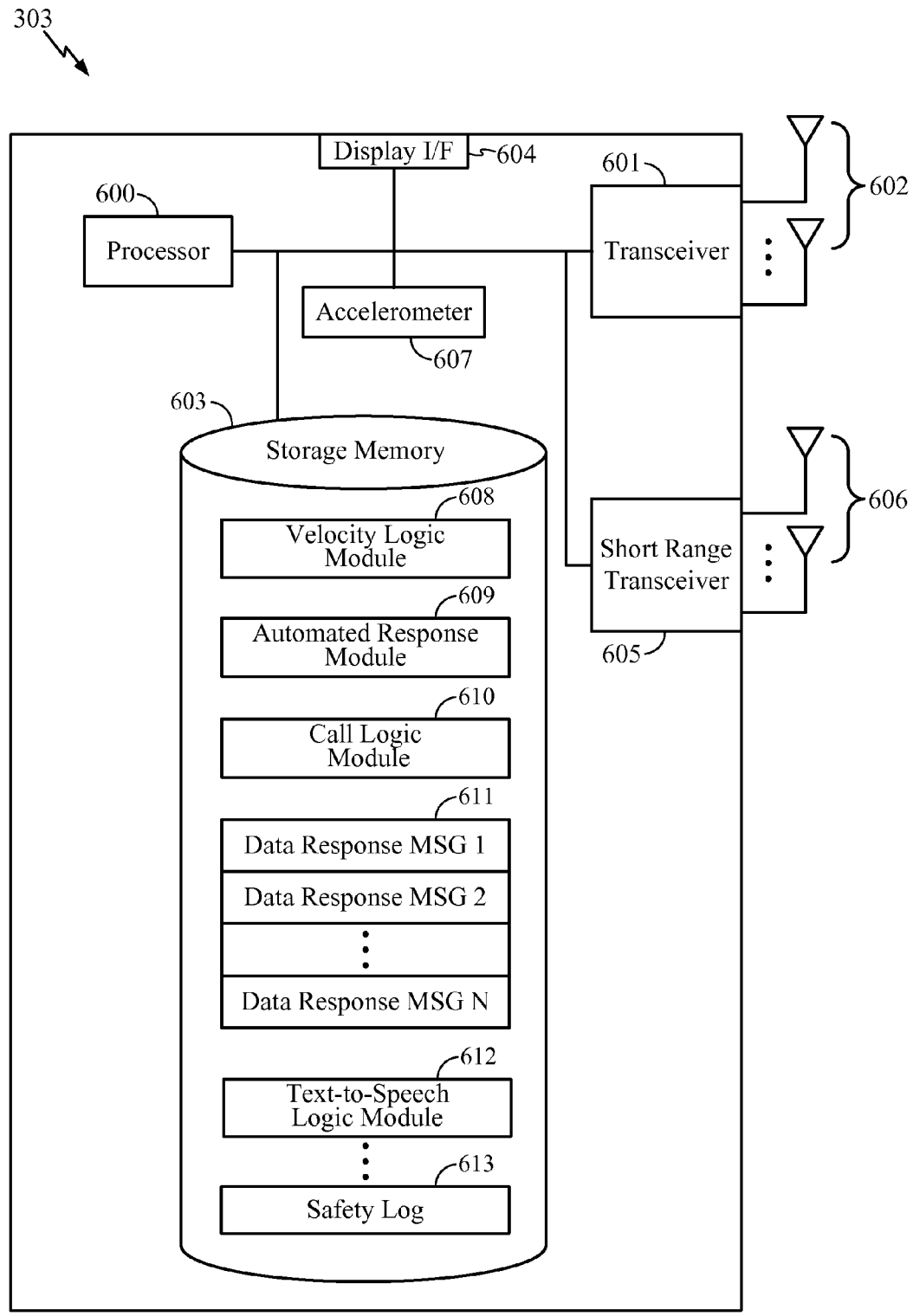
FIG. 6 is a block diagram illustrating detailed components of one of the mobile devices from FIG. 3.

FIG. 6 is a block diagram illustrating detailed components of the mobile device 303. The mobile device 303 includes many similar components as the mobile device 203 (FIG. 4). These components include a processor 600, transceiver 601, antenna array 602, a storage memory 603, a display interface 604, short range transceiver 605, antenna array 606, and accelerometer 607. The storage memory 603 contains a velocity logic module 608, an automated response module 609, a call logic module 610, a data store 611 holding data response messages, and a text-to-speech logic module 612. As described in FIG. 3, the mobile device 303 uses only the accelerometer 607 to determine its velocity. Moreover, the mobile device 303 does not include the optional speech-to-text logic module 516 (FIG. 5), and, therefore, does not provide the same speech-to-text functionality. Each time the driver is called and presented with the response option, the executing automated response module 609 stores the call and response selection into a safety log 613 in the storage memory 603. The response information contained in the safety log 613 may be used by the user's employer to analyze how safely the user is driving using the mobile device 303. Moreover, as noted previously, law enforcement officials may also access the information contained in the safety log 613.

Figure 7:
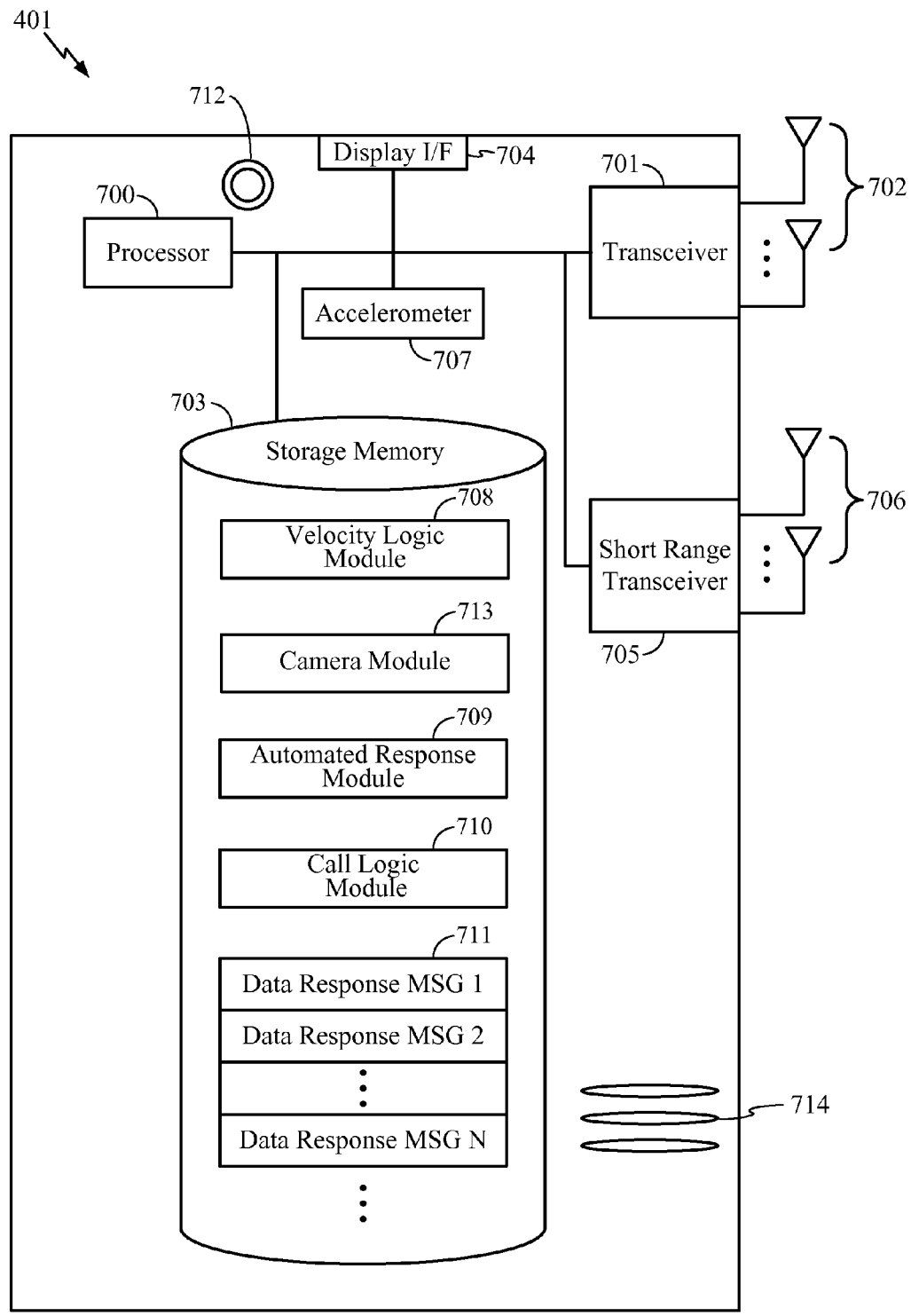
FIG. 7 is a block diagram illustrating detailed components of one of the mobile devices from FIG. 4.

FIG. 7 is a block diagram illustrating detailed components of the mobile device 401. The mobile device 401 includes many similar components as the mobile devices 203 (FIG. 5) and 303 (FIG. 6). These components include a processor 700, transceiver 701, antenna array 702, a storage memory 703, a display interface 704, short range transceiver 705, antenna array 706, and accelerometer 707. The mobile device 401 also includes a camera component 712 and a microphone 714 The storage memory 703 contains a velocity logic module 708, an automated response module 709, a call logic module 710, a data store 711 holding data response messages, and a camera module 713. When executing the automated response module 709, the mobile device 401 can take control over both the camera component 712, using the camera module 713, and the microphone 714, using the call logic module 710 in order to obtain the additional position and biometric information that is used to determine if the user is the driver 400 (FIG. 4) in an unsafe driving situation.

Figure 8A:
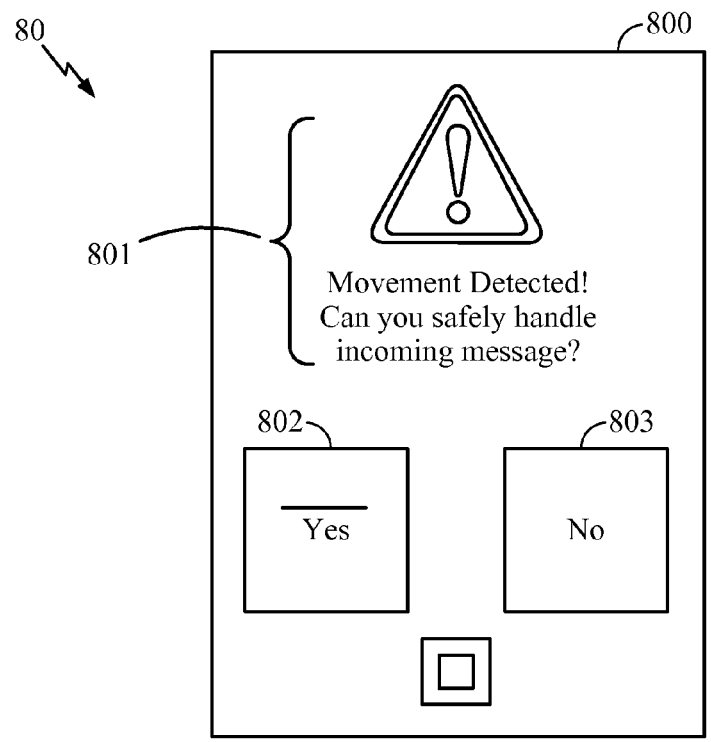
FIGS. 8A and 8B illustrate a mobile phone configured according to one aspect of the present teachings.
Figure 8B:
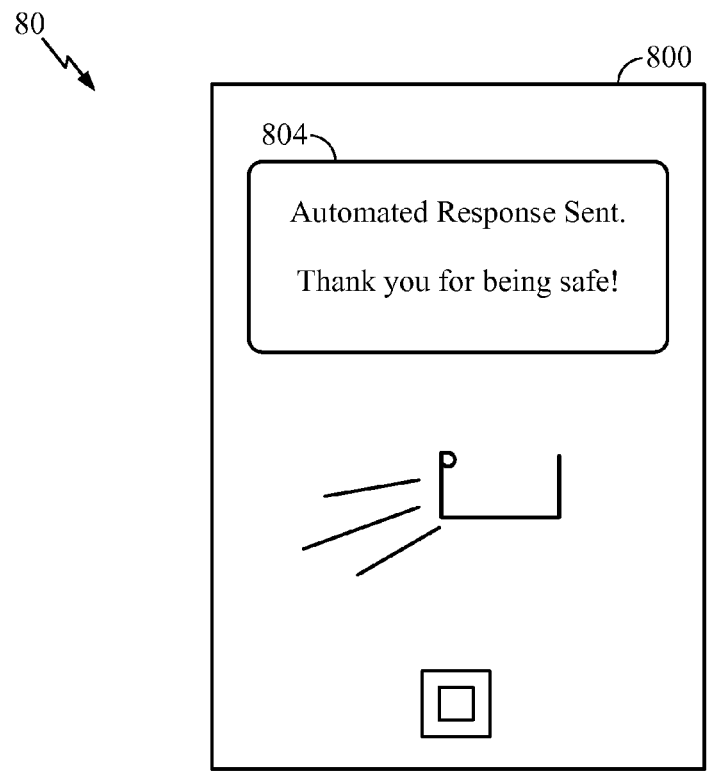

FIG. 8A is a mobile phone 80 configured according to one aspect of the present teachings. As the mobile phone 80 receives a data message and determines that its velocity exceeds the designated amount, safety message 801 is presented on display 800 inquiring if the user can safely handle the incoming message. Yes button 802 and No button 803 provide input interfaces for the user to respond to the prompts. The user actuates the No button 803 which triggers the mobile phone 80 to transmit an automated response message to the data message sender. FIG. 8B illustrates the mobile phone 80 after the automated response message has been sent. A message 804 is presented on the display 800 indicating to the user that the automated message has been sent. The automated response feature will then revert to monitoring for new data messages.

Figure 9:
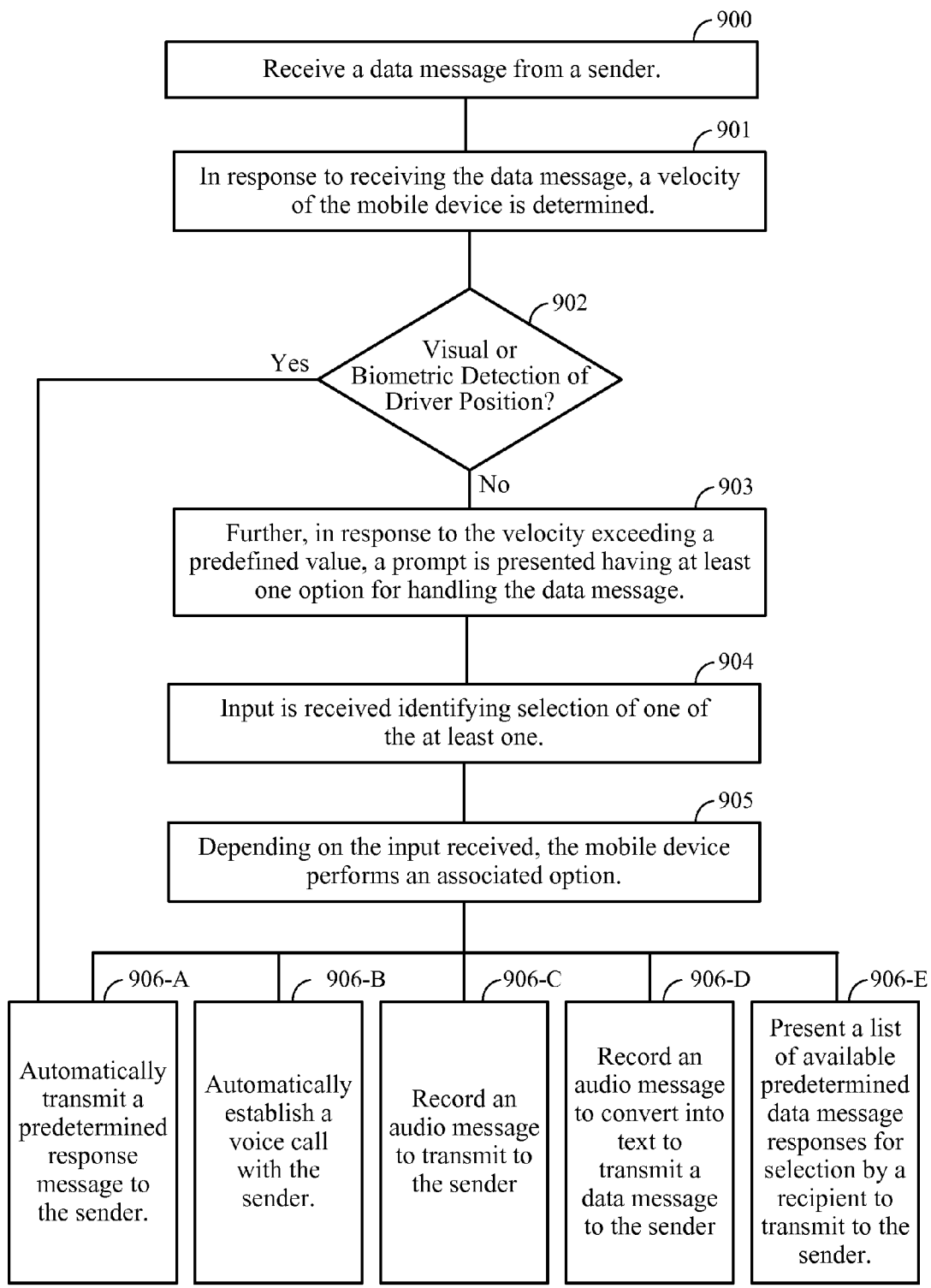
FIG. 9 is a functional block diagram illustrating functional blocks present in one aspect of the present teachings.

FIG. 9 is a functional block diagram illustrating functional blocks present in one aspect of the present teachings. In block 900, a data message is received from a sender. In response to receiving the data message, a velocity of the mobile device is determined in block 901. In block 902, visual and biometric information is used to determine whether the mobile device is in the driver's position. If so, then the mobile device autonomously transmits a predetermined response message to the sender, in block 906-A. Otherwise, if the visual and biometric information cannot indicate where the mobile device position is, in further response to the velocity exceeding a predefined value, a prompt is presented in block 903 having at least one option for handling the data message. In block 904, input is received identifying selection of one of the at least one. A determination is made, in block 905, identifying the input received, after which the mobile device performs an associated option. In a first option, in block 906-A, a predetermined response message is autonomously transmitted to the sender. In a second option, in block 906-B, a voice call is autonomously established with the sender. In a third option, in block 906-C, an audio message is recorded to transmit to the sender. In a fourth option, in block 906-D, an audio message is recorded which will be converted into text to transmit a data message to the sender. In a fifth option, in block 906-E, a list of available predetermined data message responses is presented for selection by a recipient to transmit to the sender.

The methodologies described herein may be implemented by various components depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software code may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included Within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Figure 10:
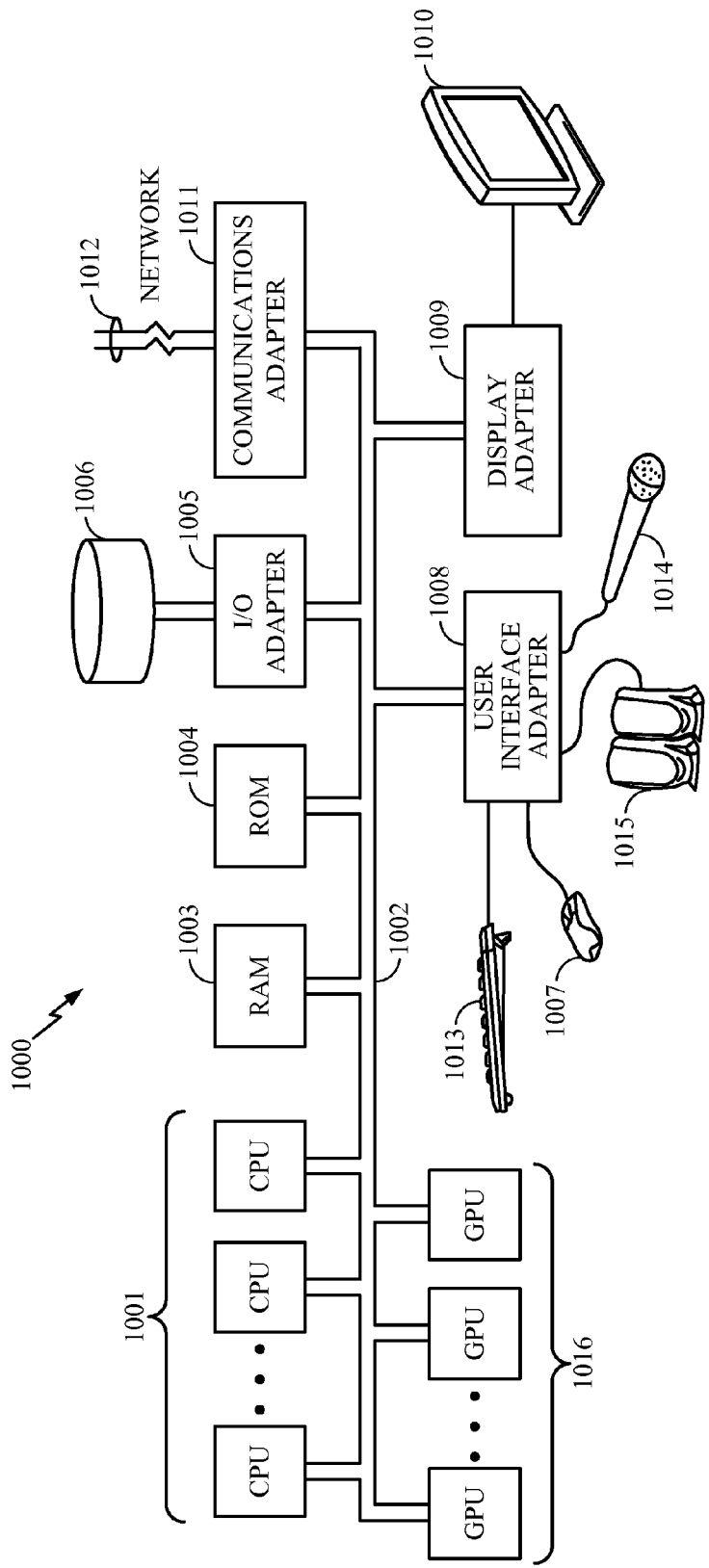
FIG. 10 illustrates an exemplary computer system which may be employed to implement certain aspects of the present teachings.

FIG. 10 illustrates an exemplary computer system 1000 which may be employed to implement certain aspects of the present teachings. A central processing unit ("CPU" or "processor") 1001 is coupled to a system bus 1002. The CPU 1001 may be any general-purpose processor. The present disclosure is not restricted by the architecture of the CPU 1001 (or other components of the exemplary computer system 1000) as long as the CPU 1001 (and other components of the computer system 1000) supports the inventive operations as described herein. As such, the CPU 1001 may provide processing to the computer system 1000 through one or more processors or processor cores. The CPU 1001 may execute the various logical instructions described herein. For example, the CPU 1001 may execute machine-level instructions according to the exemplary operational flow described above in conjunction with FIG. 9. When executing instructions representative of the operational steps and signal processing illustrated in FIG. 9, the CPU 1001 becomes a special-purpose processor of a special purpose computing platform configured specifically to operate according to the various aspects of the teachings described herein.

The computer system 1000 also includes a random access memory (RAM) 1003 which may be SRAM, DRAM, SDRAM, or the like. The computer system 1000 includes a read-only memory (ROM) 1004 which may be PROM, EPROM, EEPROM, or the like. The RAM 1003 and ROM 1004 hold user and system data and programs, as is well known in the art.

The I/O adapter 1005 connects to a storage device(s) 1006, such as one or more of hard drive, compact disc (CD) drive, floppy disk drive, tape drive, etc., to the computer system 1000. The storage devices are utilized in addition to the RAM 1003 for the memory requirements associated with saving the look up tables corresponding channel quality measurements to QCM indices and the like. The communications adapter 1011 is adapted to couple the computer system 1000 to a network 1012, which may enable information to be input to and/or output from the computer system 1000 via the network 1012 (e.g., the Internet or other wide-area network, a local-area network, a public or private switched telephony network, a wireless network, any combination of the foregoing). A user interface adapter 1008 couples user input devices, such as a keyboard 1013, a pointing device 1007, and a microphone 1014 and/or output devices, such as speaker(s) 1015 to the computer system 1000. A display adapter 1009 is driven by the CPU 1001 or by a graphical processing unit (GPU) 1016 to control the display on the display device 1010. The GPU 1016 may be any various number of processors dedicated to graphics processing and, as illustrated, may be made up of one or more individual graphical processors. The GPU 1016 processes the graphical instructions and transmits those instructions to the display adapter 1009. The display adapter 1009 further transmits those instructions for transforming or manipulating the state of the various numbers of pixels used by the display device 1010 to visually present the desired information to a user. Such instructions include instructions for changing state from on to off, setting a particular color, intensity, duration, or the like. Each such instruction makes up the rendering instructions that control how and what is displayed on the display device 1010.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular aspects of the process, machine, manufacture, composition of matter, means, methods and steps described in the specification. As one of ordinary skill in the art can readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or steps.

What is claimed is:

1. A method for managing incoming data messages at a mobile device, said method comprising:
   receiving a data message from a sender;
   in response to said receiving, determining a velocity of said mobile device;
   in response to determining, at the mobile device, that said velocity is greater than a predefined value, analyzing, at the mobile device, external data measured by at least one component of said mobile device; and
   preventing, by the mobile device, announcement of said received data message, and autonomously transmitting, by the mobile device, a predetermined response message to said sender, in response to determining, at the mobile device, based on the external data, that the mobile device is in a driving position of a moving vehicle.

2. The method of claim 1 wherein said external data comprises at least one of:
   visual data captured by a camera component of the mobile device; and
   audio data captured by a microphone component of the mobile device.

3. The method of claim 1 further comprising:
in response to determining, at the mobile device, that the mobile device is not in said driving position, presenting a prompt having at least one option for handling said data message;
receiving input identifying selection of one of said at least one option; and
in response to said input, enabling said mobile device to perform one of:
   autonomously transmitting a predetermined response message to said sender; and
   autonomously establishing a voice call with said sender.

4. The method of claim 1 wherein said determining said velocity is performed using at least one of:
a satellite positioning system (SPS); and
an accelerometer contained within said mobile device.

5. The method of claim 3 wherein said presenting said prompt comprises:
detecting a hands-free apparatus coupled to said mobile device;
converting said data message into an audio file;
playing said audio file over said hands-free apparatus, wherein said prompt is presented as an audio prompt over said hands-free apparatus; and
monitoring said hands-free apparatus for audible response commands converted into said input.

6. The method of claim 5 wherein, in response to said input, said mobile device performs one of: said transmitting, said establishing, and recording an audio message to transmit to said sender.

7. The method of claim 6 wherein said audio message is transmitted to said sender as one of:
a multimedia message; and
a data message converted from said audio message.

8. The method of claim 3 wherein said receiving said input comprises one of:
receiving active input from a user of said mobile device; and
failing to detect a response to said prompt for a predetermined time.

9. A mobile device comprising:
a processor;
a transceiver coupled to said processor and to an antenna array;
a display device coupled to said processor;
an inertial reference apparatus coupled to said processor;
at least one external data capture device;
a storage memory coupled to said processor; and
an automated response module stored on said storage memory, wherein, when executed by said processor, said executing automated response module configures said mobile device:
   to receive a data message from a sender;
   to determine, in response to said receiving, a velocity of said mobile device using said inertial reference apparatus;
   to analyze, at the mobile device, in response to determining, at the mobile device, that said velocity exceeds a predetermined value, external data measured by said at least one external data capture device; and
   to prevent, by the mobile device, announcement of said received data message, and to autonomously transmit, by the mobile device, a predetermined response message to said sender, in response to determining, at the mobile device, based on the external data, that the mobile device is in a driving position of a moving vehicle.

10. The mobile device of claim 9 wherein said external data comprises at least one of:
visual data, wherein said at least one external data capture device comprises a camera component; and
audio data, wherein said at least one external data capture device comprises a microphone component.

11. The mobile device of claim 9 wherein said executing automated response module further configures said mobile device:
to present, in response to determining that said velocity exceeds a predefined value and in response to determining that said mobile device is not in said driving position, a prompt on said display device having at least one option for handling said data message;
to receive input identifying selection of one of said at least one option; and
to enable, in response to said input, said mobile device to perform one of:
autonomously transmitting a predetermined response message to said sender; and
autonomously establishing a voice call with said sender.

12. The mobile device of claim 9 wherein said inertial reference apparatus comprises at least one of:
a satellite positioning system (SPS) transceiver coupled to another antenna array; and
an accelerometer.

13. The mobile device of claim 11 wherein configuration of said mobile device to present said prompt comprises configuring said mobile device:
to detect a hands-free apparatus coupled to said mobile device;
to convert said data message into an audio file using a text-to-speech logic module stored on said storage memory and executed by said processor;
to play said audio file over said hands-free apparatus, wherein said prompt is presented as an audio prompt over said hands-free apparatus; and
to monitor said hands-free apparatus for audible response commands converted into said input.

14. The mobile device of claim 11 wherein, in response to said input, said mobile device is configured to perform one of: said transmitting, said establishing, and recording an audio message to transmit to said sender.

15. The mobile device of claim 14 wherein said audio message is transmitted to said sender as one of:
a multimedia message; and
a data message converted from said audio message.

16. The mobile device of claim 11 wherein configuration of said mobile device to receive said input comprises configuring said mobile device for one of:
receiving active input from a user of said mobile device; and
detecting a failure to respond to said prompt for a predetermined time-out period.

17. A non-transitory computer readable medium including program code tangibly stored thereon, comprising:
program code to receive a data message from a sender;
program code, executable in response to said receiving, to determine a velocity of a mobile device;
program code, executable in response to determining, at the mobile device, that said velocity is greater than a predefined value, to analyze, at the mobile device, external data measured by at least one component of said mobile device; and program code to prevent, by the mobile device, announcement of said received data message, and to autonomously transmit, by the mobile device, a predetermined response message to said sender, in response to determining, at the mobile device, based on the external data, that the mobile device is in a driving position of a moving vehicle.

18. The non-transitory computer readable medium of claim 17 wherein said external data comprises at least one of:
   visual data captured by a camera component of the mobile device; and
   audio data captured by a microphone component of the mobile device.

19. The non-transitory computer readable medium of claim 17 further comprising:
   program code, executable in response to determining, at the mobile device, that the mobile device is not in said driving position, to present a prompt having at least one option for handling said data message;
   program code to receive input identifying selection of one of said at least one option; and
   program code, executable in response to said input, to enable said mobile device to perform one of:
      autonomously transmitting a predetermined response message to said sender; and
      autonomously establishing a voice call with said sender.

20. The non-transitory computer readable medium of claim 17 wherein said program code to determine said velocity is performed using at least one of:
   a satellite positioning system (SPS); and
   an accelerometer contained within said mobile device.

21. The non-transitory computer readable medium of claim 19 wherein said program code to present said prompt comprises:
   program code to detect a hands-free apparatus coupled to said mobile device;
   program code to convert said data message into an audio file;
   program code to play said audio file over said hands-free apparatus, wherein said prompt is presented as an audio prompt over said hands-free apparatus; and
   program code to monitor said hands-free apparatus for audible response commands converted into said input.

22. The non-transitory computer readable medium of claim 19 wherein, in response to said input, said mobile device executes one of: said program code to transmit, said program code to establish, and program code to record an audio message to transmit to said sender.

23. The non-transitory computer readable medium of claim 22 wherein said audio message is transmitted to said sender as one of:
   a multimedia message; and
   a data message converted from said audio message.

24. The non-transitory computer readable medium of claim 19 wherein said program code to receive said input comprises one of:
   program code to receive active input from a user of said mobile device; and
   program code to detect failure to receive a response to said prompt for a predetermined time.

25. A system for managing incoming data messages at a mobile device, said system comprising:
   means for receiving a data message from a sender;
   means, executable in response to said receiving, for determining a velocity of said mobile device;
   means, executable in response to determining, at the mobile device, that said velocity is greater than a predefined value, for analyzing, at the mobile device, external data measured by at least one component of said mobile device; and
   means for preventing, by the mobile device, announcement of said received data message, and for autonomously transmitting, by the mobile device, a predetermined response message to said sender, in response to determining, at the mobile device, based on the external data, that the mobile device is in a driving position of a moving vehicle.

26. The system of claim 25 wherein said external data comprises at least one of:
   visual data captured by a camera component of the mobile device; and
   audio data captured by a microphone component of the mobile device.

27. The system of claim 25 further comprising:
   means, executable in response to determining, at the mobile device, that the mobile device is not in said driving position, for presenting a prompt having at least one option for handling said data message;
   means for receiving input identifying selection of one of said at least one option; and
   means, executable in response to said input, for enabling said mobile device to perform one of:
      autonomously transmitting a predetermined response message to said sender; and
      autonomously establishing a voice call with said sender.

28. The system of claim 27 wherein said means for presenting said prompt comprises:
   means for detecting a hands-free apparatus coupled to said mobile device;
   means for converting said data message into an audio file;
   means for playing said audio file over said hands-free apparatus, wherein said prompt is presented as an audio prompt over said hands-free apparatus; and
   means for monitoring said hands-free apparatus for audible response commands converted into said input.

29. The method of claim 1, wherein the mobile device is in the driving position of the moving vehicle when the mobile device is in possession of a driver of the moving vehicle.

30. The method of claim 1, wherein the moving vehicle is a car, and the mobile device is in the driving position of the moving vehicle when the mobile device is on the driver side of the car.

31. The method of claim 1, wherein determining, at the mobile device, that said external data indicates that the mobile device is in the driving position of the moving vehicle is based on visual information and biometric information obtained by the mobile device.

32. The method of claim 31, wherein the visual information comprises an image that includes at least one of: a passenger seat of the moving vehicle, a passenger of the moving vehicle, and a center console of the moving vehicle.

33. The method of claim 31, wherein the biometric information comprises an audio sample that includes at least one heart beat.

* * * * *